United States Patent
Kubota et al.

(10) Patent No.: US 8,018,662 B2
(45) Date of Patent: Sep. 13, 2011

(54) IMAGING LENS

(75) Inventors: Yoji Kubota, Nagano (JP); Ichiro Kurihara, Tochigi (JP)

(73) Assignees: Optical Logic Inc., Nagano (JP); Kantatsu Co., Ltd., Tochigi (JP)

( * ) Notice: Subject to any disclaimer, the term of this patent is extended or adjusted under 35 U.S.C. 154(b) by 0 days.

(21) Appl. No.: 12/782,824

(22) Filed: May 19, 2010

(65) Prior Publication Data
US 2010/0321800 A1 Dec. 23, 2010

Related U.S. Application Data

(63) Continuation of application No. PCT/JP2010/056540, filed on Apr. 12, 2010.

(30) Foreign Application Priority Data

May 28, 2009 (JP) ................. 2009-129433

(51) Int. Cl.
G02B 9/14 (2006.01)
G02B 3/02 (2006.01)
(52) U.S. Cl. .................. 359/785; 359/716; 359/784
(58) Field of Classification Search .................. 359/716, 359/784, 785, 789
See application file for complete search history.

(56) References Cited

U.S. PATENT DOCUMENTS

| 7,394,602 | B2 * | 7/2008 | Chen et al. ..................... 359/785 |
| 7,408,725 | B2 * | 8/2008 | Sato .............................. 359/785 |
| 7,436,603 | B2 * | 10/2008 | Huang et al. .................. 359/716 |
| 7,567,392 | B2 * | 7/2009 | Tamura .......................... 359/785 |
| 7,742,240 | B2 * | 6/2010 | Kim et al. ...................... 359/785 |
| 7,800,842 | B2 * | 9/2010 | Iba et al. ....................... 359/785 |

FOREIGN PATENT DOCUMENTS

| JP | 2008-76594 | 4/2008 |
| JP | 2008233221 A | * 10/2008 |

OTHER PUBLICATIONS

English-language translation of the International Search Report (PCT/ISA/210) prepared by the Japanese Patent Office in connection with PCT/JP2010/056540 (Aug. 24, 2010).*

* cited by examiner

*Primary Examiner* — David N Spector
(74) *Attorney, Agent, or Firm* — Kubotera & Associates LLC

(57) ABSTRACT

An imaging lens includes a first lens L1 having positive curvature radii on both an object side and an image side, a second lens L2 having a concave shape on both sides, and a third lens L3 having positive curvature radii on both the object side and the image side. The first to third lenses L1 to L3 are arranged in this order from the object side toward the image side. When the first lens L1 has a focal length f1 and the second lens L2 has a focal length f2, the imaging lens is configured such that a relationship f1>|f2| is satisfied.

3 Claims, 15 Drawing Sheets

Numerical Data Example 1

IMAGING LENS

CROSS-REFERENCE TO RELATED APPLICATIONS

This is a continuation application of a prior PCT application No. PCT JP 2010/56540, filed Apr. 12, 2010, pending.

BACKGROUND OF THE INVENTION AND RELATED ART STATEMENT

The present invention relates to an imaging lens for forming an image on an imaging element such as a CCD sensor and a CMOS sensor. In particular, the present invention relates to an imaging lens suitable for mounting in a relatively small camera such as a cellular phone, a digital still camera, a portable information terminal, a security camera, an onboard camera, and a network camera.

An imaging lens to be mounted in a small camera has been required to have a high resolution lens configuration suitable for a recently developed imaging element with a high resolution, as well as to use a fewer number of lenses. Conventionally, various lens configurations have been proposed. Among the various lens configurations, a configuration formed of three lenses has been suitable for miniaturization and easy to correct various aberrations properly, and has been applied to many cameras.

An imaging lens disclosed in Patent Reference has been known as an imaging lens having such a three-lens configuration. The imaging lens disclosed in Patent Reference includes a first lens having positive refractive power; a second lens having negative refractive power; and a third lens having positive refractive power arranged in this order from an object side. In the configuration, the third lens has a shorter focal length relative to that of a whole lens system, that is, the third lens has relatively strong refractive power. Further, the first lens has refractive power stronger than that of the second lens. Accordingly, it is possible to correct a field curvature or coma aberration.

Patent Reference Japanese Patent Application Publication No. 2008-76594

In recent years, miniaturization and resolution increase of cellular phones and cameras have been rapidly advanced, and even an imaging lens has been increasingly required to have more advanced performances than before. The imaging lens disclosed in Patent Reference has been known to properly correct aberration. However, the lens system has a relatively long focal length. Accordingly, it is difficult to reduce a distance of an optical axis from a surface of the first lens on the object side to an image plane. Therefore, it is difficult to achieve both miniaturization and satisfactory aberration correction.

In view of the problems of the conventional techniques described above, an object of the present invention is to provide an imaging lens with a small size capable of properly correcting aberration.

SUMMARY OF THE INVENTION

In order to attain the object described above, according to the present invention, an imaging lens includes a first lens having positive refractive power; a second lens having negative refractive power; and a third lens having positive refractive power arranged in an order from an object side to an image side. The first lens is formed in a shape so that both a curvature radius of a surface thereof on the object side and a curvature radius of a surface thereof on the image side are positive. The second lens is formed in a shape so that a curvature radius of a surface thereof on the object side is negative and a curvature radius of a surface thereof on the image side is positive. The third lens is formed in a shape so that both a curvature radius of a surface thereof on the object side and a curvature radius of a surface thereof on the image side are positive. Further, when the first lens has a focal length f1 and the second lens has a focal length f2, the imaging lens satisfies the following conditional expression (1):

$$f1 > |f2| \tag{1}$$

When the conditional expression (1) is satisfied, it is possible to reduce a length (a thickness) of the imaging lens along an optical axis thereof.

According to the invention, the first lens is formed in the shape so that both the curvature radius of the surface thereof on the object side and the curvature radius of the surface thereof on the image side are positive, i.e., the shape to be a meniscus lens near the optical axis. Further, the second lens is formed in the shape so that the curvature radius of the surface thereof on the object side is negative and the curvature radius of the surface thereof on the image side is positive, i.e., the shape to be a biconcave lens near the optical axis. With the configuration, refractive power of the second lens becomes stronger than that of the first lens. Accordingly, it is possible to properly reduce a size of the imaging lens, especially the thickness of the imaging lens.

In the imaging lens with the configuration described above, it is preferred to satisfy the following conditional expression (2):

$$-1.5 < f1/f2 < -1.0 \tag{2}$$

When the conditional expression (2) is satisfied, it is possible to restrain a spherical aberration, an axial chromatic aberration, an off-axis chromatic aberration of magnification, and a field curvature within optimal ranges, while reducing the thickness of the imaging lens. When the value exceeds the upper limit "−1.0", the refractive power of the second lens decreases, and the axial chromatic aberration and the off-axis chromatic aberration of magnification become insufficiently corrected (that of a short wavelength increases in a minus direction in relative to that of a reference wavelength). In addition, an off-axis image surface tilts in the minus direction relative to an ideal image plane with a small amount of the spherical aberration, thereby causing insufficient correction of the image surface. On the other hand, when the value is below the lower limit "−1.5", the refractive power of the second lens increases, and the axial chromatic aberration and the off-axis chromatic aberration of magnification become excessively corrected (that of the short wavelength increases in a plus direction in relative to that of the reference wavelength). Moreover, the off-axis image surface tilts in the plus direction in relative to the ideal image plane with a small amount of the spherical aberration, thereby causing excessive correction of the image surface. In either case, it is difficult to obtain a good imaging performance.

In the imaging lens with the configuration described above, when the surface of the second lens on the object side has a curvature radius R3 and the surface on the image side has a curvature radius R4, it is preferred to satisfy the following conditional expression (3):

$$-0.15 < R3/R4 < 0 \tag{3}$$

When the conditional expression (3) is satisfied, it is possible to restrain the aberration within an optimal range while reducing the thickness of the imaging lens. When the value exceeds the upper limit "0", a position of a principal point of the lens system tends to move toward the image side thereof.

Accordingly, it is difficult to reduce the size of the imaging lens. In addition, the image surface tilts in the minus direction, so that an inward coma aberration is generated due to an off-axis light beam. On the other hand, when the value is below the lower limit "−0.15", the position of the principal point of the lens system tends to move toward the object side. Accordingly, it is possible to effectively reduce the size of the imaging lens. However, the image surface tilts in the plus direction, so that an outward comma aberration is generated due to an off-axis light beam. Therefore, it is difficult to obtain good imaging performance.

In the imaging lens with the configuration described above, when the whole lens system has a focal length f and the third lens has a focal length f3, it is preferred to satisfy the following conditional expression (4):

$$0.7 < f3/f < 2.0 \tag{4}$$

When the conditional expression (4) is satisfied, it is possible to restrain an incident angle of a light beam emitted from the imaging lens to an imaging element within a certain range, and also restrain astigmatism and the field curvature within optimal ranges. As well known, in order for an imaging element to receive a light beam, an incident angle of the light beam needs to be below a maximum incident angle according to a structure of the imaging element. When the light beam outside the range of the maximum incident angle enters the imaging element, a resultant image tends to have a dark periphery due to a shading phenomenon. Accordingly, it is necessary to restrain the incident angle of the light beam emitted from the imaging lens to the imaging element within a certain range.

In the conditional expression (4), when the value exceeds the upper limit "2.0", the focal length of the third lens becomes long in relative to the focal length of the whole lens system, and the refractive power of the third lens decreases relatively. Accordingly, the incident angle of the light beam emitted from the imaging lens to the imaging element increases and the astigmatic difference also increases. Especially, the astigmatic difference increases at an off-axis extreme periphery, and it is difficult to correct the astigmatism. On the other hand, when the value is below the lower limit "0.7", the refractive power of the third lens increases relatively. Accordingly, it is easier to restrain the incident angle of the light beam emitted from the imaging lens to the imaging element within the certain range. However, it is difficult to correct the off-axis chromatic aberration of magnification, and to maintain the image surface flatness.

In the imaging lens with the configuration described above, when the whole lens system has the focal length f and the surface of the third lens on the object side has a curvature radius R5, it is preferred to satisfy the following conditional expression (5):

$$R5/f < 0.35 \tag{5}$$

When the conditional expression (5) is satisfied, it is possible to maintain flatness of the image surface while reducing the thickness of the imaging lens and obtaining good image-forming performance. When the surface of the third lens on the object side has the curvature radius within a range represented with the conditional expression (5), the position of the principal point of the whole lens system tends to move toward the object side. Further, it is possible to reduce the thickness of the imaging lens in relative to the focal length of the whole lens system, while maintaining the flatness of the imaging surface, thereby making it possible to obtain good imaging performance.

According to the imaging lens of the invention, the image surface is corrected at the first lens. Accordingly, it is possible to both reduce the size of the imaging lens and correct the aberration properly, thereby making it possible to provide the imaging lens with the small size capable of correcting aberrations properly.

DETAILED DESCRIPTION OF PREFERRED EMBODIMENTS

Hereunder, referring to the accompanying drawings, embodiments of the present invention will be described.

FIGS. 1, 4, 7, 10, and 13 are schematic sectional views showing image lenses in Numerical Data Examples 1 to 5 according to the embodiment, respectively. Since a basic lens configuration is the same among the Numerical Data Examples 1 to 5, the lens configuration of the embodiments will be described with reference to the lens sectional view of Numerical Data Example 1.

Figure 1:
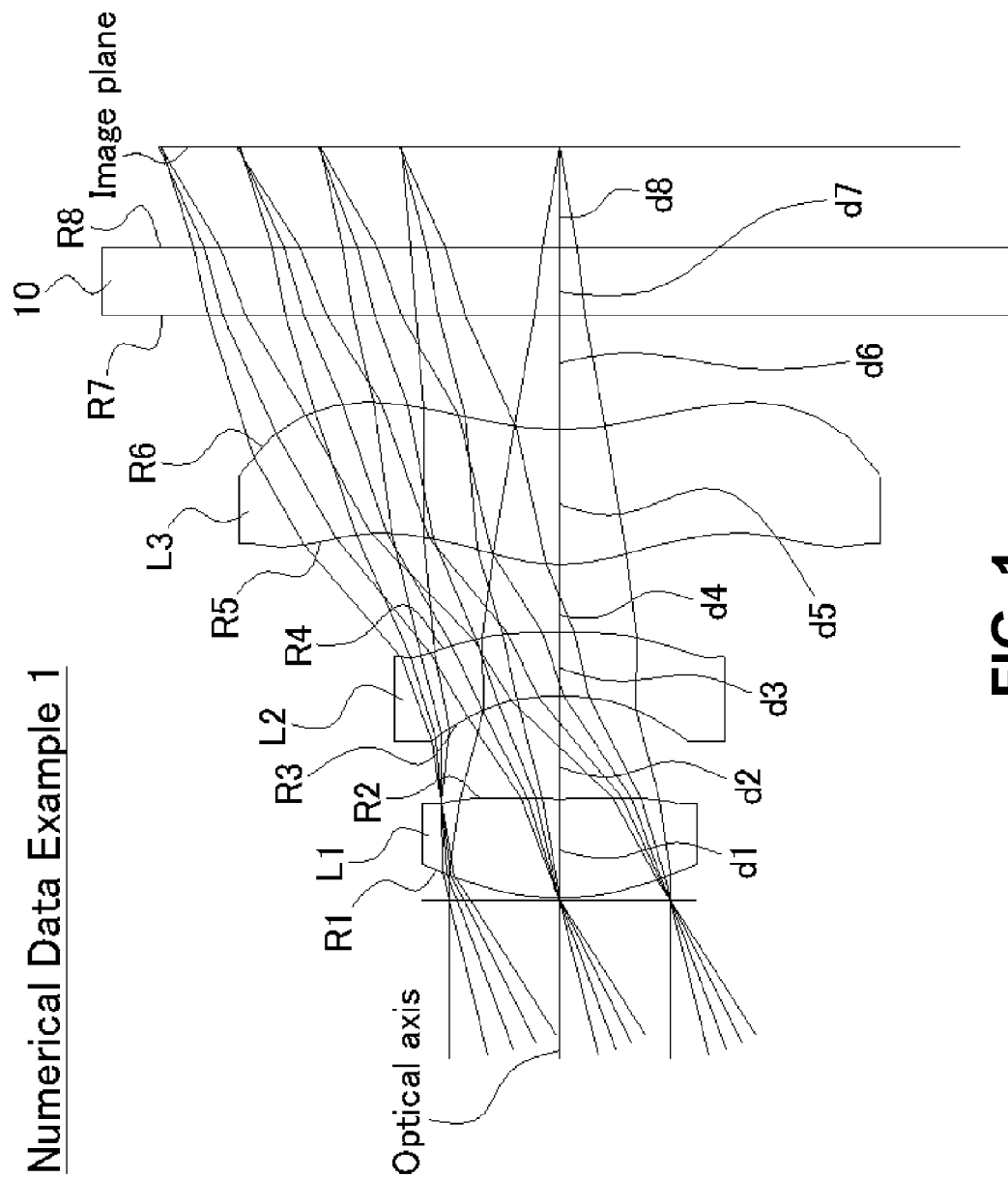
FIG. 1 is a schematic sectional view showing a configuration of an imaging lens in Numerical Data Example 1 according to an embodiment of the invention.

As shown in FIG. 1, the imaging lens of the embodiment has a first lens L1 having positive refractive power; a second lens L2 having negative refractive power; and a third lens L3 having positive refractive power, which are arranged in this order from an object side to an image side of the imaging lens. A cover glass 10 is provided between the third lens L3 and an image plane of an imaging element. It is noted that the cover glass 10 may be optionally omitted.

The first lens L1 has an aspheric surface, in which a curvature radius of a surface on the object side and a curvature radius of a surface on the image side are both positive, i.e., it is shaped to form a meniscus lens near an optical axis. Among the surfaces, the surface on the image side is formed to have an aspheric surface, in which the surface has a convex shape on the object side near the optical axis and a concave shape on the object side at a periphery thereof.

The second lens L2 is formed to have an aspheric surface, in which a curvature radius of a surface on the object side is negative and a curvature radius of a surface on the image side is positive, i.e., it has a shape of a biconcave lens near the optical axis. Among the surfaces, the surface on the image side is formed to be an aspheric surface, in which the surface has a convex shape on the object side near the optical axis and a concave shape on the object side at the periphery thereof, similarly to the surface of the first lens L1 on the image side.

The third lens L3 is formed to have an aspheric surface, in which a curvature radius of a surface on the object side is positive and a curvature radius of a surface on the image side is positive, i.e., it has a shape of a meniscus lens near the optical axis. The third lens L3 is formed to have an aspheric surface, in which the surface on the object side and the surface on the image side are both convex shapes on the object side near the optical axis and concave shapes on the object side at the periphery thereof. In the embodiment, a position of an aperture stop is located at a position closer to the object side with reference to a contact surface of the object side surface vertex of the first lens L1. It is noted that the position of the aperture stop is not limited to the position in the embodiment, and for example, it may be located between the contact surface of the object side surface vertex of the first lens L1 and the image side surface of the first lens L1.

In the embodiment, all of the lens surfaces of the first lens L1 through the third lens L3 are formed to be the aspheric surfaces. When the aspheric surface applied to the lens surfaces have an axis Z in the optical axis direction, a height H in a direction perpendicular to the optical axis, a conical coefficient k, and aspheric surface coefficients $A_4, A_6, A_8, A_{10}, A_{12}, A_{14},$ and $A_{16}$, the aspheric surfaces of the lens surfaces may be expressed as follows:

$$Z = \frac{\frac{H^2}{R}}{1 + \sqrt{1 - (k+1)\frac{H^2}{R^2}}} + A_4 H^4 + A_6 H^6 +$$

$$A_8 H^8 + A_{10} H^{10} + A_{12} H^{12} + A_{14} H^{14} + A_{16} H^{16}$$

[Formula 1]

When the focal length of the whole lens system is f, the focal length of the first lens L1 is f1, the focal length of the second lens L2 is f2, the focal length of the third lens L3 is f3, and the curvature radius of the surface of the third lens on the object side is R5, the imaging lens of the embodiment satisfies the following conditional expressions:

$$f1 > |f2| \quad (1)$$

$$-1.5 < f1/f2 < -1.0 \quad (2)$$

$$-0.15 < R3/R4 < 0 \quad (3)$$

$$0.7 < f3/f < 2.0 \quad (4)$$

$$R5/f < 0.35 \quad (5)$$

Furthermore, when the curvature radius of the surface of the third lens L3 on the image side is R6, the imaging lens of the embodiment satisfies the following conditional expression (6):

$$0.4 < R5/R6 < 0.8 \quad (6)$$

When the conditional expression (6) is satisfied, the position of the principal point of the third lens is moved toward the object side. Accordingly, it is possible to further reduce the thickness of the imaging lens.

Here, it is not necessary to satisfy all of the conditional expressions (1) to (6). When any single one of the conditional expressions (1) to (6) is individually satisfied, it is possible to obtain an effect corresponding to the respective conditional expression. Further, it is possible to configure a small-sized imaging lens, in which the aberrations are satisfactorily corrected, in comparison with a conventional imaging lens.

Next, Numerical Data Examples of the embodiment will be described. In each of Numerical Data Examples, f represents a focal length of a whole lens system, Fno represents an F number, and ω represents a half angle of view, respectively. In addition, i represents a surface number counted from the object side, R represents a curvature radius, d represents a distance between lens surfaces (an on-axis surface spacing) along the optical axis, Nd represents a refractive index for a d line, and νd represents Abbe's number for the d line. Here, the aspheric surfaces are indicated with surface numbers affixed with * (asterisk).

Numerical Data Example 1

Basic lens data are shown below.

f=2.755 mm, Fno=2.850, ω=32.42°

| Unit: mm | | | | |
|---|---|---|---|---|
| Surface Number i | R | d | Nd | νd |
| (object) | ∞ | ∞ | | |
| Aperture | ∞ | 0.0100 | | |
| 1* | 1.099 | 0.4350 | 1.52470 | 56.2 |
| 2* | 8.682 | 0.4495 | | |
| 3* | −1.298 | 0.2800 | 1.61420 | 26.0 |
| 4* | 38.578 | 0.2975 | | |
| 5* | 0.725 | 0.5920 | 1.52470 | 56.2 |
| 6* | 1.161 | 0.5000 | | |
| 7 | ∞ | 0.3000 | 1.51680 | 64.2 |
| 8 | ∞ | 0.4380 | | |
| (image plane) | ∞ | | | |

Aspheric Surface Data

First Surface k = 6.426815E−02, $A_4$ = −1.274980E−01, $A_6$ = 6.576042E−01, $A_8$ = −5.443474, $A_{10}$ = 1.378558E+01, $A_{12}$ = −1.817097E+01

Second Surface k = 0, $A_4$ = −4.730207E−01, $A_6$ = 2.729801, $A_8$ = −2.311784E+01, $A_{10}$ = 8.432159E+01, $A_{12}$ = −1.630665E+02, $A_{14}$ = 1.246037E+02

Third Surface k = 0, $A_4$ = −1.875961, $A_6$ = 9.379379, $A_8$ = −4.552163E+01, $A_{10}$ = 1.617128E+02, $A_{12}$ = −3.228141E+02, $A_{14}$ = 2.782329E+02

-continued

Unit: mm

Fourth Surface k = 0, $A_4$ = −2.729579 $A_6$ = 1.217701E+01, $A_8$ = −3.960113E+01, $A_{10}$ = 8.828174E+01, $A_{12}$ = −1.066584E+02, $A_{14}$ = 5.491539E+01

Fifth Surface k = −4.497677, $A_4$ = −5.323880E−01, $A_6$ = 5.053916E−01, $A_8$ = −3.236248E−01, $A_{10}$ = 1.009636E−01, $A_{12}$ = −2.676717E−02, $A_{14}$ = 3.325881E−02, $A_{16}$ = −1.183349E−02

Sixth Surface k = −1.961540, $A_4$ = −4.587839E−01, $A_6$ = 2.802953E−01, $A_8$ = −5.856463E−02, $A_{10}$ = −8.315868E−02, $A_{12}$ = 6.737552E−02, $A_{14}$ = −1.961982E−02, $A_{16}$ = 1.919878E−03

The focal lengths f1 to f3 of the respective lenses L1 to L3 are as follows:

f1=2.352
f2=−2.039
f3=2.508

The values of the respective conditional expressions are as follows:

f1/f2=−1.154
R3/R4=−0.034
f3/f=0.910
R5/f=0.263
R5/R6=0.624

Accordingly, the imaging lens of Numerical Data Example 1 satisfies the conditional expressions (1) to (6).

Figure 2:
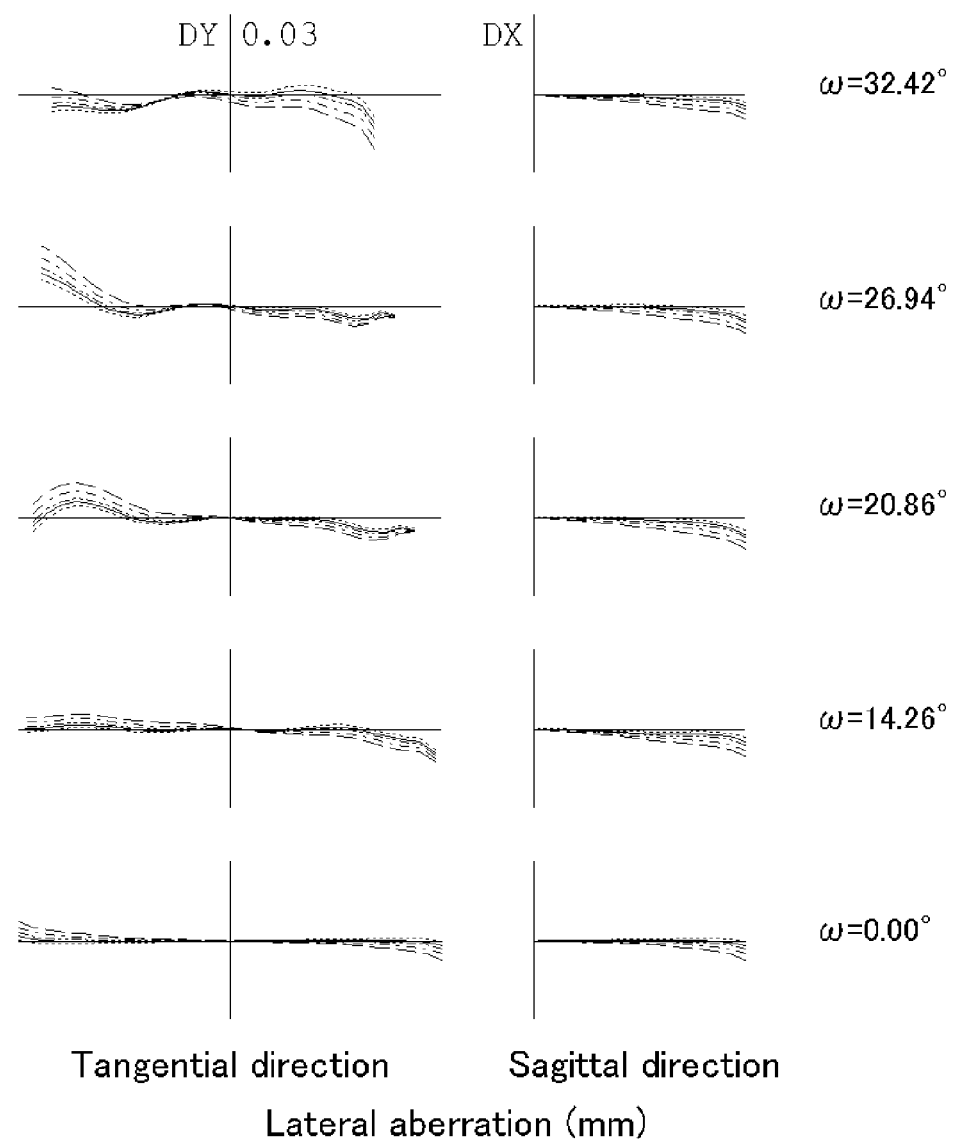
FIG. 2 is an aberration diagram showing a lateral aberration of the imaging lens in Numerical Data Example 1.
Figure 3:
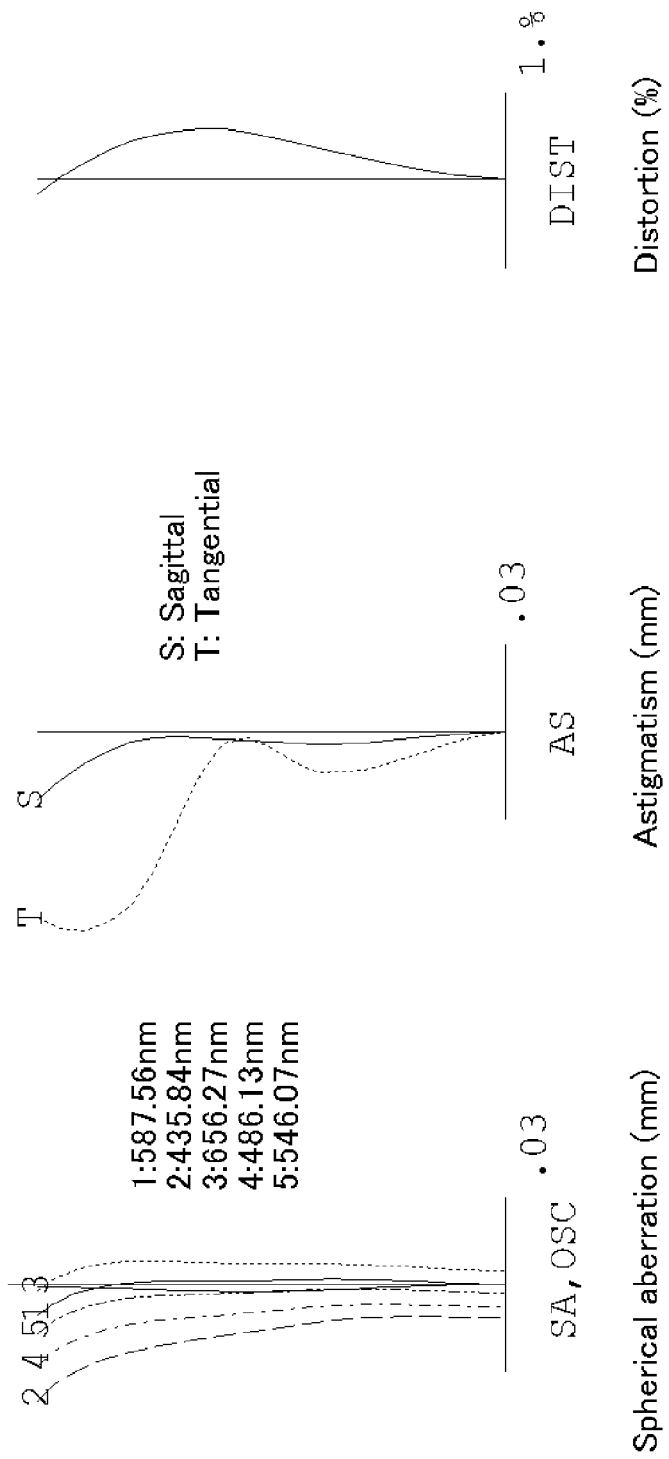
FIG. 3 is an aberration diagram showing a spherical aberration, an astigmatism, and a distortion of the imaging lens in Numerical Data Example 1.
Figure 4:
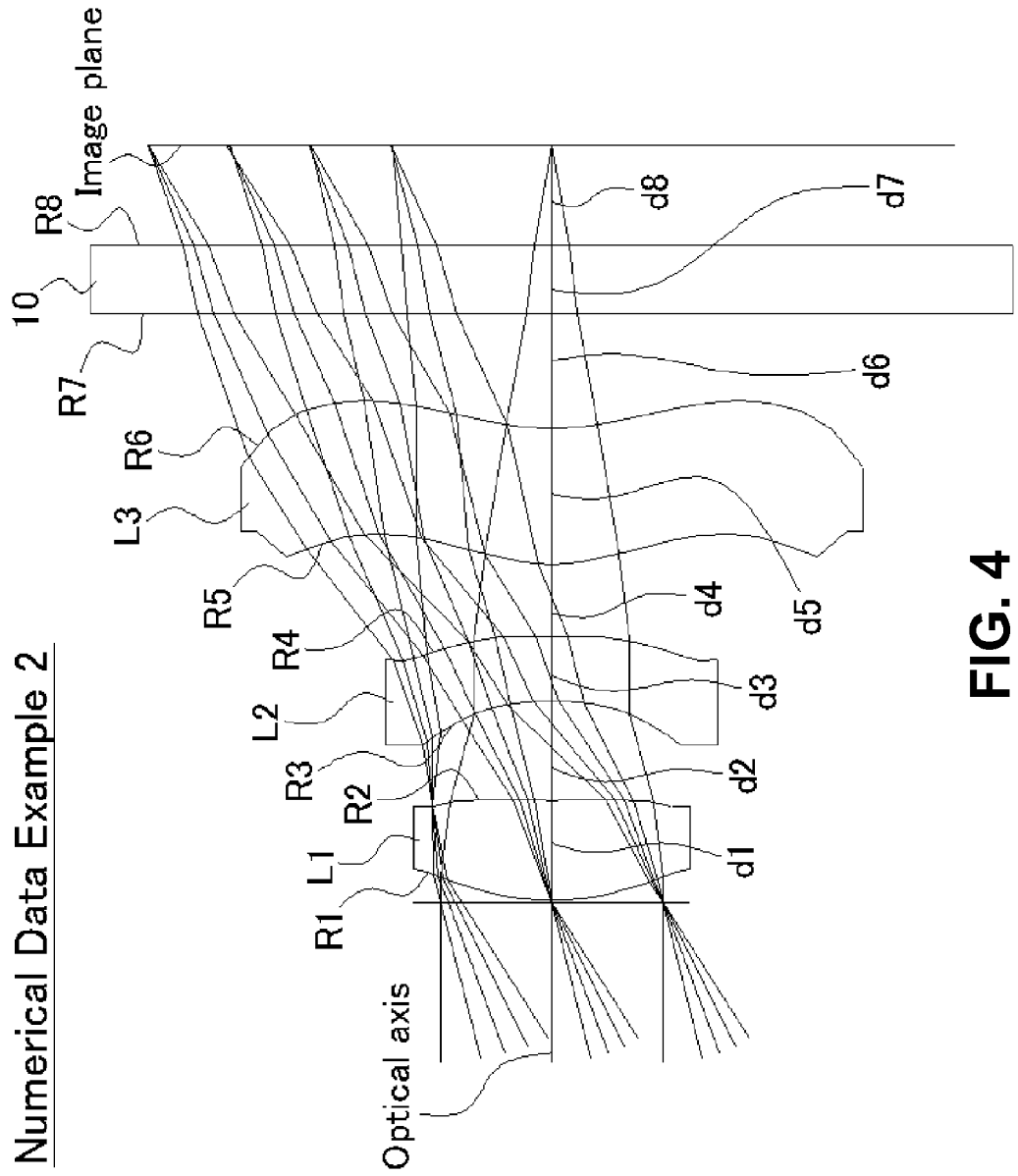
FIG. 4 is a schematic sectional view showing a configuration of an imaging lens in Numerical Data Example 2.

FIG. 2 shows the lateral aberration that corresponds to the half angle of view ω in the imaging lens of Numerical Data Example 1 by dividing into a tangential direction and sagittal direction (which is also the same in FIGS. 5, 8, 11, and 14). Furthermore, FIG. 3 shows a spherical aberration SA (mm), an astigmatism AS (mm), and a distortion DIST (%), respectively. In the aberration diagrams, the Offence against the Sine Condition (OSC) is also indicated for the spherical aberration diagram in addition to the aberrations at the respective wavelengths of 587.56 nm, 435.84 nm, 656.27 nm, 486.13 nm, and 546.07 nm. Further, in the astigmatism diagram, the aberration on the sagittal image surface S and the aberration on tangential image surface T are respectively indicated (which are the same in FIGS. 6, 9, 12, and 15).

As shown in FIGS. 2 and 3, in the imaging lens of Numerical Data Example 1, the respective aberrations are satisfactorily corrected. In addition, a distance from the surface of the first lens L1 on the object side to the image plane is 3.190 mm in air, and therefore the size of the imaging lens is suitably reduced.

Numerical Data Example 2

Basic lens data are shown below.

f=2.755 mm, Fno=2.856, ω=32.42°

| Surface Number i | R | d | Nd | νd |
|---|---|---|---|---|
| (object) | ∞ | ∞ | | |
| Aperture | ∞ | 0.0100 | | |
| 1* | 1.125 | 0.4350 | 1.52470 | 56.2 |
| 2* | 12.500 | 0.4343 | | |
| 3* | −1.318 | 0.2800 | 1.61420 | 26.0 |
| 4* | 200.000 | 0.3127 | | |
| 5* | 0.746 | 0.5920 | 1.52470 | 56.2 |
| 6* | 1.151 | 0.5000 | | |
| 7 | ∞ | 0.3000 | 1.51680 | 64.2 |
| 8 | ∞ | 0.4379 | | |
| (image plane) | ∞ | | | |

Aspheric Surface Data

First Surface k = −8.914650E−02, $A_4$ = −1.158943E−01, $A_6$ = 5.412113E−01, $A_8$ = −5.398870, $A_{10}$ = 1.603254E+01, $A_{12}$ = −2.345668E+01

Second Surface k = 0, $A_4$ = −4.790185E−01, $A_6$ = 2.426647, $A_8$ = −2.200582E+01, $A_{10}$ = 8.918107E+01, $A_{12}$ = −1.958162E+02, $A_{14}$ = 1.699995E+02

Third Surface k = 0, $A_4$ = −1.823482, $A_6$ = 9.504319, $A_8$ = −4.451214E+01, $A_{10}$ = 1.418019E+02, $A_{12}$ = −2.403220E+02, $A_{14}$ = 1.681818E+02

Fourth Surface k = 0, $A_4$ = −2.594266, $A_6$ = 1.190408E+01, $A_8$ = −3.898828E+01, $A_{10}$ = 8.625526E+01, $A_{12}$ = −1.020029E+02, $A_{14}$ = 5.016222E+01

Fifth Surface k = −4.684036, $A_4$ = −5.101275E−01, $A_6$ = 4.956688E−01, $A_8$ = −4.215493E−01, $A_{10}$ = 2.386715E−01, $A_{12}$ = −5.101631E−02, $A_{14}$ = −4.402596E−02, $A_{16}$ = 2.777939E−02

Sixth Surface k = −3.506741, $A_4$ = −3.564409E−01, $A_6$ = 2.168872E−01, $A_8$ = −6.727847E−02, $A_{10}$ = −5.373438E−02, $A_{12}$ = 6.234373E−02, $A_{14}$ = −2.597220E−02, $A_{16}$ = 3.851417E−03

The focal lengths f1 to f3 of the respective lenses L1 to L3 are as follows:

f1=2.326
f2=−2.131
f3=2.688

The values of the respective conditional expressions are as follows:

f1/f2=−1.092
R3/R4=−0.0066
f3/f=0.976
R5/f=0.271
R5/R6=0.648

Accordingly, the imaging lens of Numerical Data Example 2 satisfies the conditional expressions (1) to (6).

Figure 5:
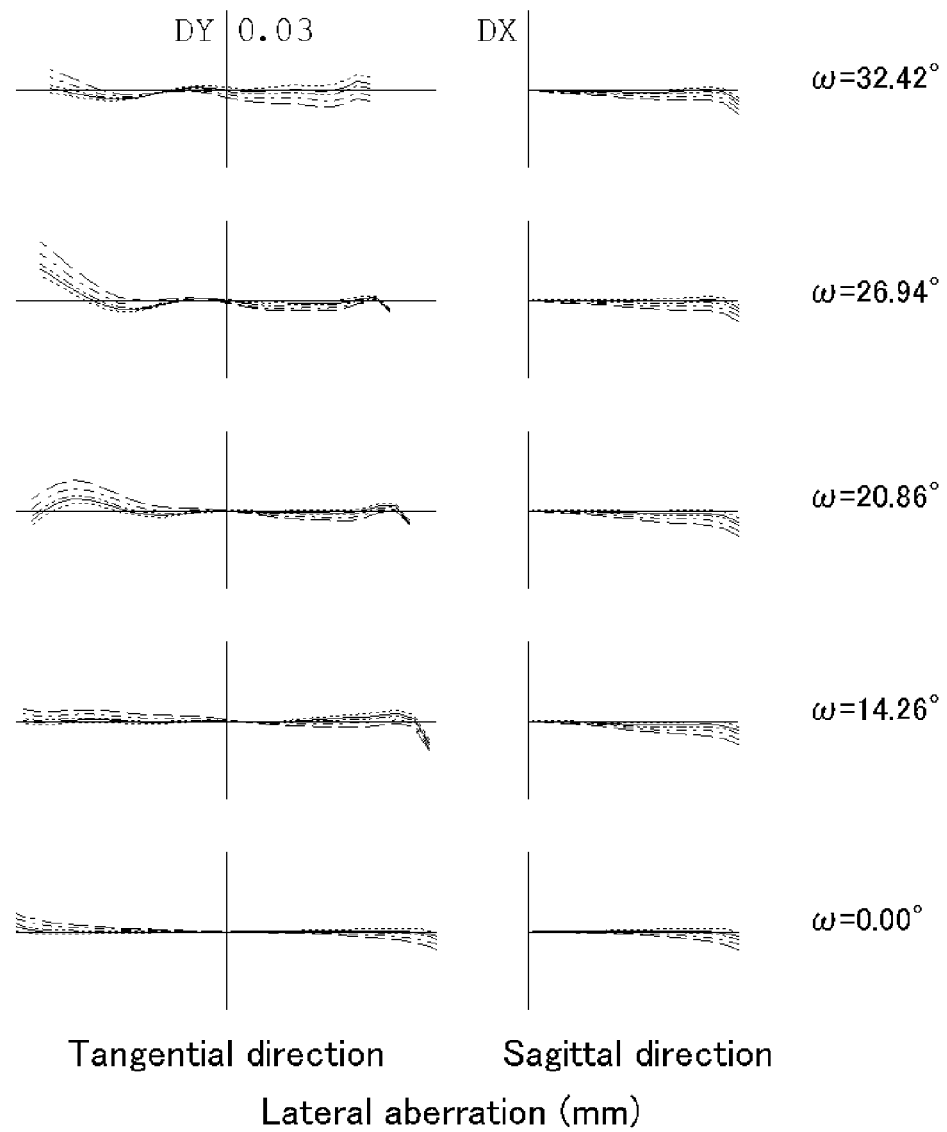
FIG. 5 is an aberration diagram showing a lateral aberration of the imaging lens in Numerical Data Example 2.
Figure 6:
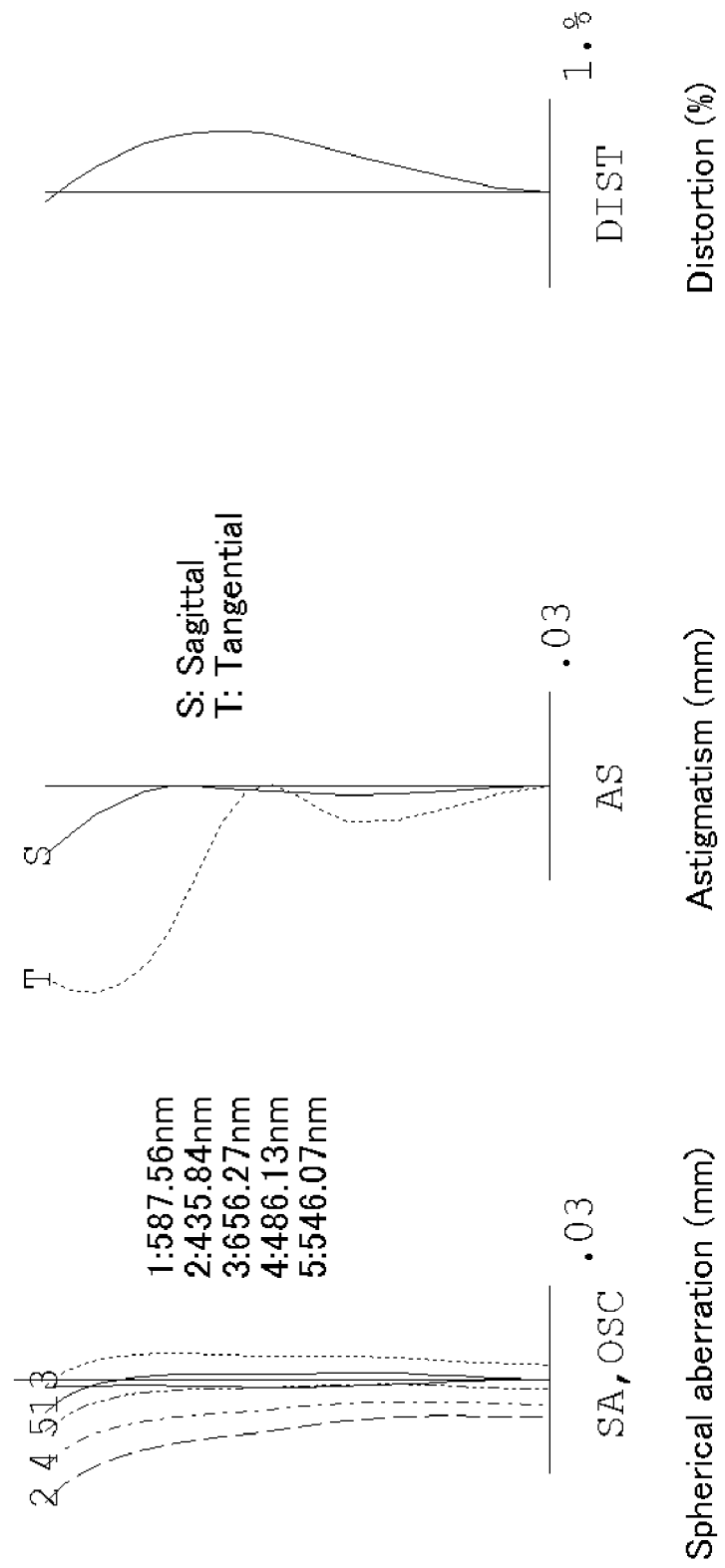
FIG. 6 is an aberration diagram showing a spherical aberration, an astigmatism, and a distortion of the imaging lens in Numerical Data Example 2.
Figure 7:
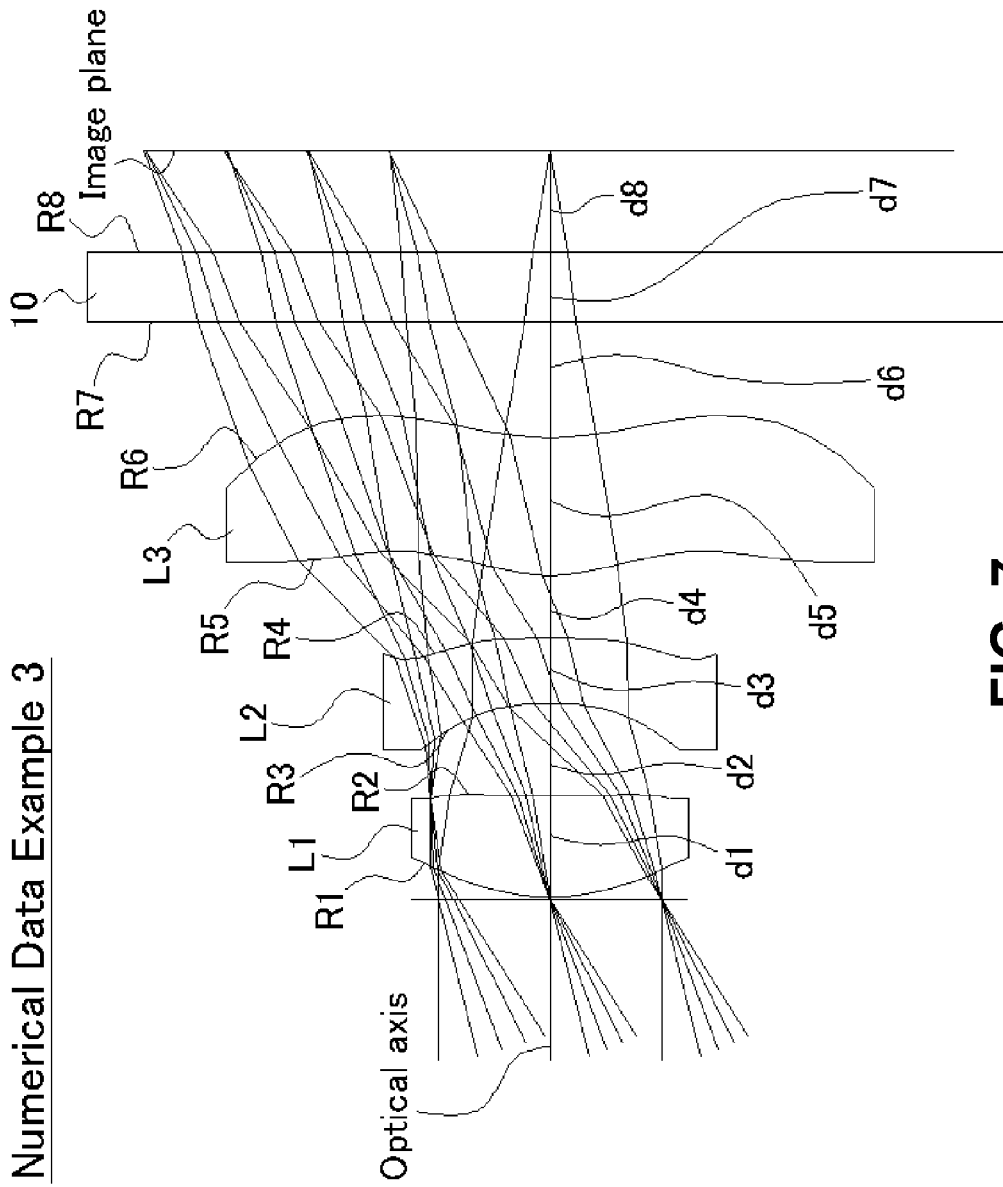
FIG. 7 is a schematic sectional view showing a configuration of an imaging lens in Numerical Data Example 3.

FIG. 5 shows the lateral aberration that corresponds to the half angle of view ω in the imaging lens of Numerical Data Example 2, and FIG. 3 shows the spherical aberration SA (mm), the astigmatism AS (mm), and the distortion DIST (%), respectively. As shown in FIGS. 5 and 6, in the imaging lens of Numerical Data Example 2, the respective aberrations are satisfactorily corrected similarly to Numerical Data Example 1. In addition, the distance from the surface of the first lens L1 on the object side to the image plane is 3.190 mm in air, and therefore the size of the imaging lens is suitably reduced.

Numerical Data Example 3
Basic lens data are shown below.
f=2.755 mm, Fno=2.850, ω=32.42°

| Unit: mm | | | | |
|---|---|---|---|---|
| Surface Number i | R | d | Nd | vd |
| (object) | ∞ | ∞ | | |
| Aperture | ∞ | 0.0100 | | |
| 1* | 1.001 | 0.4350 | 1.52470 | 56.2 |
| 2* | 5.280 | 0.4001 | | |
| 3* | −1.336 | 0.2800 | 1.61420 | 26.0 |
| 4* | 35.726 | 0.2730 | | |
| 5* | 0.783 | 0.5920 | 1.52470 | 56.2 |
| 6* | 1.268 | 0.5000 | | |
| 7 | ∞ | 0.3000 | 1.51680 | 64.2 |
| 8 | ∞ | 0.4380 | | |
| (image plane) | ∞ | | | |

Aspheric Surface Data

First Surface k = 1.385921E−01, $A_4$ = −1.105327E−01, $A_6$ = 4.341908E−01, $A_8$ = −4.539008, $A_{10}$ = 1.358329E+01, $A_{12}$ = −2.220118E+01

Second Surface k = 0, $A_4$ = −4.750056E−01, $A_6$ = 2.515805, $A_8$ = −2.200691E+01, $A_{10}$ = 8.149431E+01, $A_{12}$ = −1.689783E+02, $A_{14}$ = 1.355450E+02

Third Surface k = 0, $A_4$ = −1.889448, $A_6$ = 9.971419, $A_8$ = −5.144650E+01, $A_{10}$ = 1.727270E+02, $A_{12}$ = −3.092295E+02, $A_{14}$ = 2.261174E+02

Fourth Surface k = 0, $A_4$ = −2.682545, $A_6$ = 1.226094E+01, $A_8$ = −3.987432E+01, $A_{10}$ = 8.895554E+01, $A_{12}$ = −1.046861E+02, $A_{14}$ = 5.158349E+01

Fifth Surface k = −5.613991, $A_4$ = −5.825126E−01, $A_6$ = 4.770209E−01, $A_8$ = −2.430452E−01, $A_{10}$ = 1.108924E−01, $A_{12}$ = −3.246531E−02, $A_{14}$ = 3.111906E−02, $A_{16}$ = −1.768331E−02

Sixth Surface k = −2.130209, $A_4$ = −4.614729E−01, $A_6$ = 2.653650E−01, $A_8$ = −5.695514E−02, $A_{10}$ = −7.639584E−02, $A_{12}$ = 6.733014E−02, $A_{14}$ = −2.054796E−02, $A_{16}$ = 2.128754E−03

The focal lengths f1 to f3 of the respective lenses L1 to L3 are as follows:
f1=2.274
f2=−2.091
f3=2.747

The values of the respective conditional expressions are as follows:
f1/f2=−1.088
R3/R4=−0.037
f3/f=0.997
R5/f=0.284
R5/R6=0.618

Accordingly, the imaging lens of Numerical Data Example 3 satisfies the conditional expressions (1) to (6).

Figure 8:
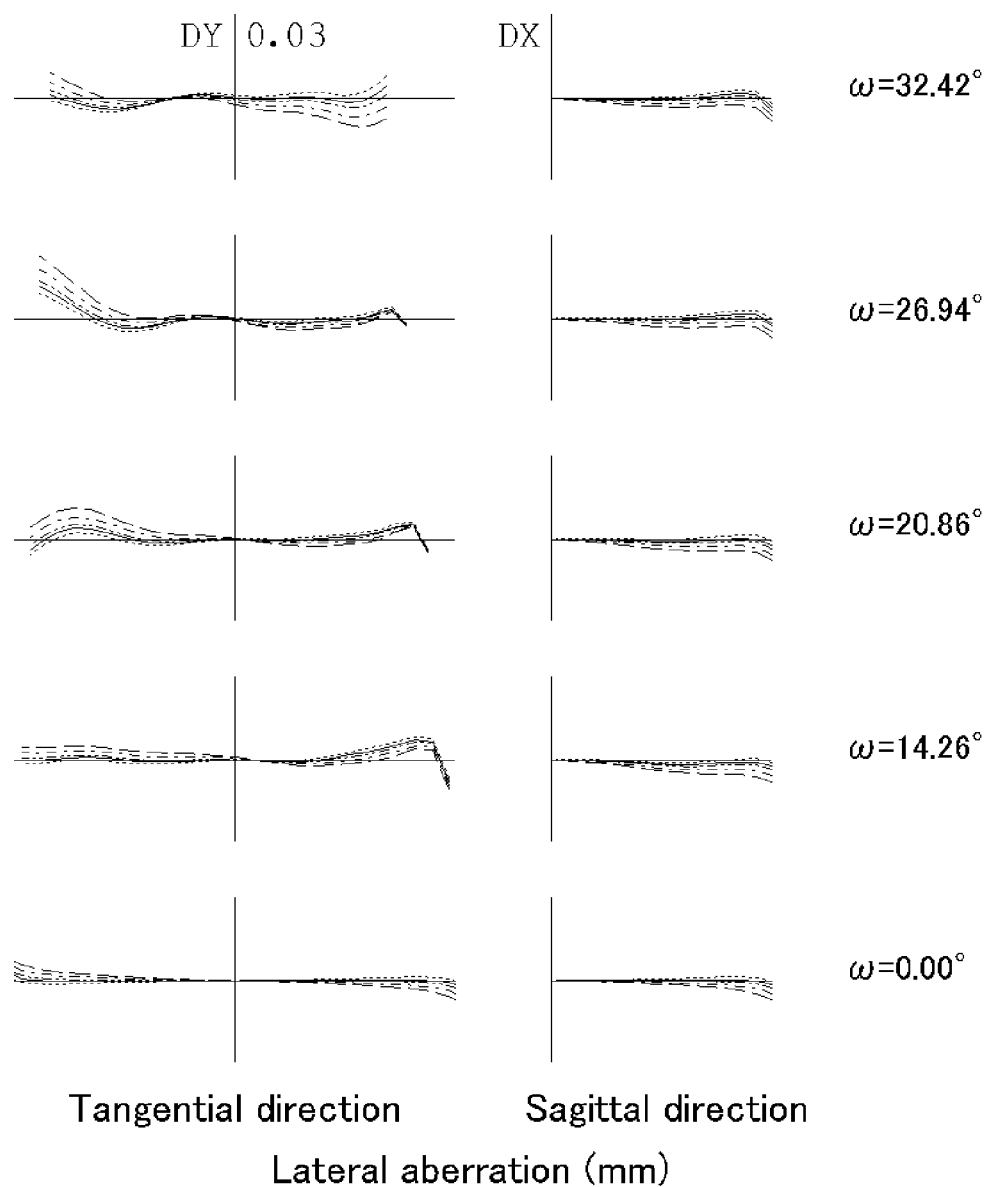
FIG. 8 is an aberration diagram showing a lateral aberration of the imaging lens in Numerical Data Example 3.
Figure 9:
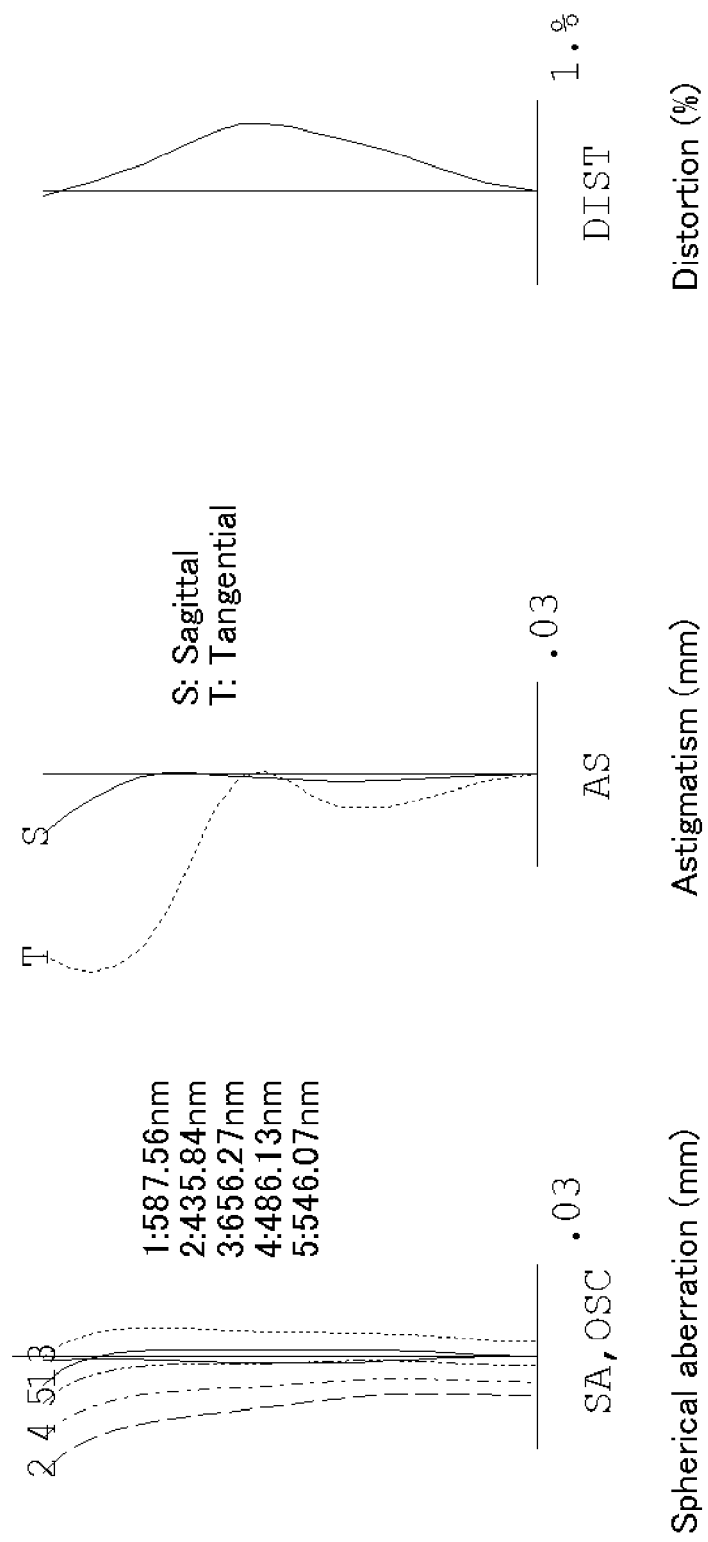
FIG. 9 is an aberration diagram showing a spherical aberration, an astigmatism, and a distortion of the imaging lens in Numerical Data Example 3.
Figure 10:
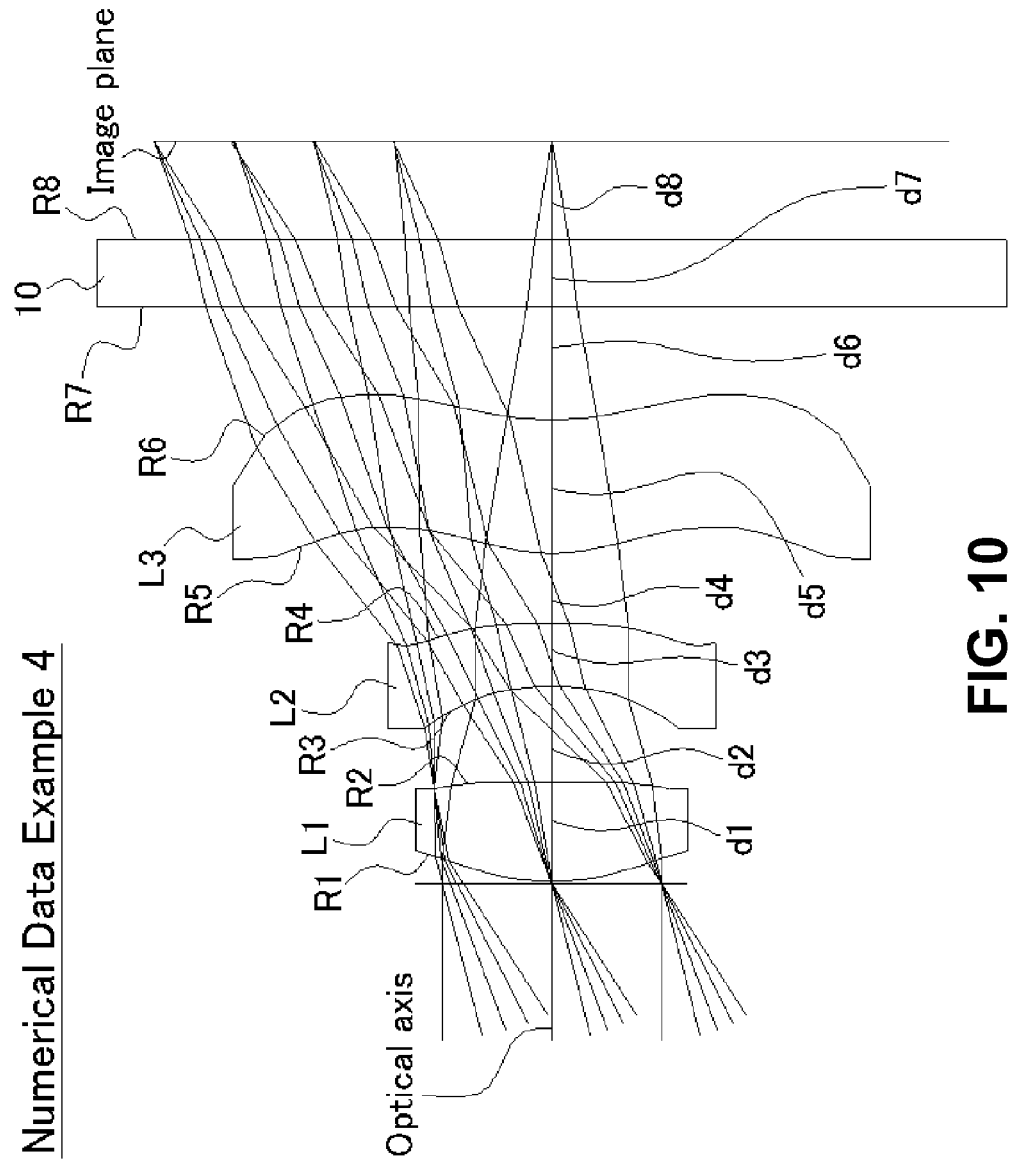
FIG. 10 is a schematic sectional view showing a configuration of an imaging lens in Numerical Data Example 4.

FIG. 8 shows the lateral aberration that corresponds to the half angle of view ω in the imaging lens of Numerical Data Example 3, and FIG. 9 shows the spherical aberration SA (mm), the astigmatism AS (mm), and the distortion DIST (%), respectively. As shown in FIGS. 8 and 9, in the imaging lens of Numerical Data Example 3, the respective aberrations are satisfactorily corrected similarly to Numerical Data Example 1. In addition, the distance from the surface of the first lens L1 on the object side to the image plane is 3.116 mm in air, and therefore the size of the imaging lens is suitably reduced.

Numerical Data Example 4
Basic lens data are shown below.
f=2.755 mm, Fno=2.850, ω=32.42°

| Unit: mm | | | | |
|---|---|---|---|---|
| Surface Number i | R | d | Nd | vd |
| (object) | ∞ | ∞ | | |
| Aperture | ∞ | 0.0100 | | |
| 1* | 1.136 | 0.4350 | 1.52470 | 56.2 |
| 2* | 17.127 | 0.4259 | | |
| 3* | −1.336 | 0.2800 | 1.61420 | 26.0 |
| 4* | 113.986 | 0.3072 | | |
| 5* | 0.759 | 0.5920 | 1.52470 | 56.2 |
| 6* | 1.156 | 0.5000 | | |
| 7 | ∞ | 0.3000 | 1.51680 | 64.2 |
| 8 | ∞ | 0.4380 | | |
| (image plane) | ∞ | | | |

Aspheric Surface Data

First Surface k = 1.354803E−02, $A_4$ = −1.351444E−01, $A_6$ = 4.561194E−01, $A_8$ = −4.950700, $A_{10}$ = 1.380837E+01, $A_{12}$ = −1.997703E+01

Second Surface k = 0, $A_4$ = −5.176951E−01, $A_6$ = 2.474208, $A_8$ = −2.162632E+01, $A_{10}$ = 8.261589E+01, $A_{12}$ = −1.669586E+02, $A_{14}$ = 1.320005E+02

Third Surface k = 0, $A_4$ = −1.889776, $A_6$ = 1.032620E+01, $A_8$ = −5.118409E+01, $A_{10}$ = 1.742297E+02, $A_{12}$ = −3.063878E+02, $A_{14}$ = 2.151946E+02

Fourth Surface k = 0, $A_4$ = −2.635824, $A_6$ = 1.216520E+01, $A_8$ = −3.995768E+01, $A_{10}$ = 8.902605E+01, $A_{12}$ = −1.044775E+02, $A_{14}$ = 5.015896E+01

Fifth Surface k = −4.853250, $A_4$ = −5.426235E−01, $A_6$ = 4.459239E−01, $A_8$ = −2.630135E−01, $A_{10}$ = 9.668535E−02, $A_{12}$ = −4.078648E−02, $A_{14}$ = 3.120054E−02, $A_{16}$ = −8.779699E−03

Sixth Surface k = −2.594260, $A_4$ = −4.321099E−01, $A_6$ = 2.627892E−01, $A_8$ = −6.132590E−02, $A_{10}$ = −7.668307E−02, $A_{12}$ = 6.751941E−02, $A_{14}$ = −2.067252E−02, $A_{16}$ = 1.762155E−03

The focal lengths f1 to f3 of the respective lenses L1 to L3 are as follows:
f1=2.297
f2=−2.148
f3=2.784

The values of the respective conditional expressions are as follows:
f1/f2=−1.069
R3/R4=−0.012
f3/f=1.011
R5/f=0.275
R5/R6=0.657

Accordingly, the imaging lens of Numerical Data Example 1 satisfies the conditional expressions (1) to (6).

Figure 11:
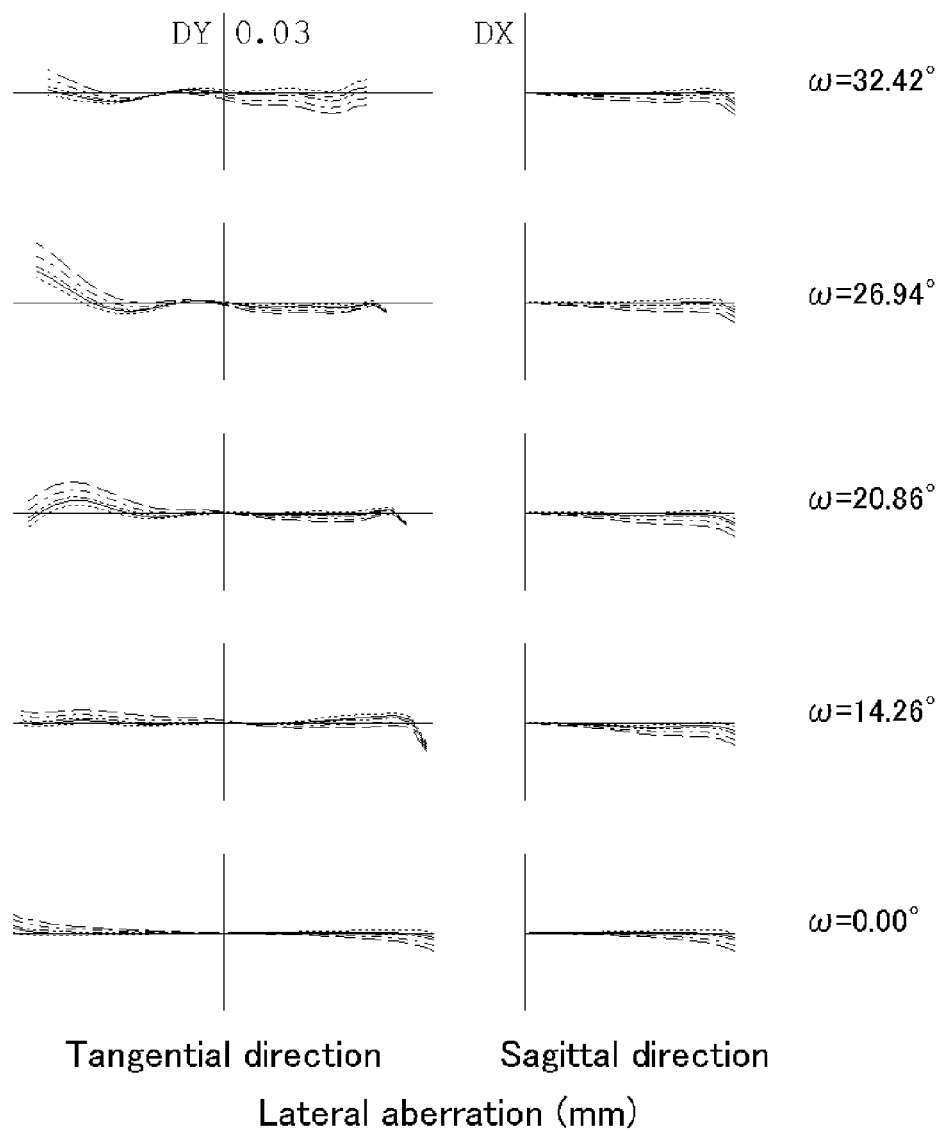
FIG. 11 is an aberration diagram showing a lateral aberration of the imaging lens in Numerical Data Example 4.
Figure 12:
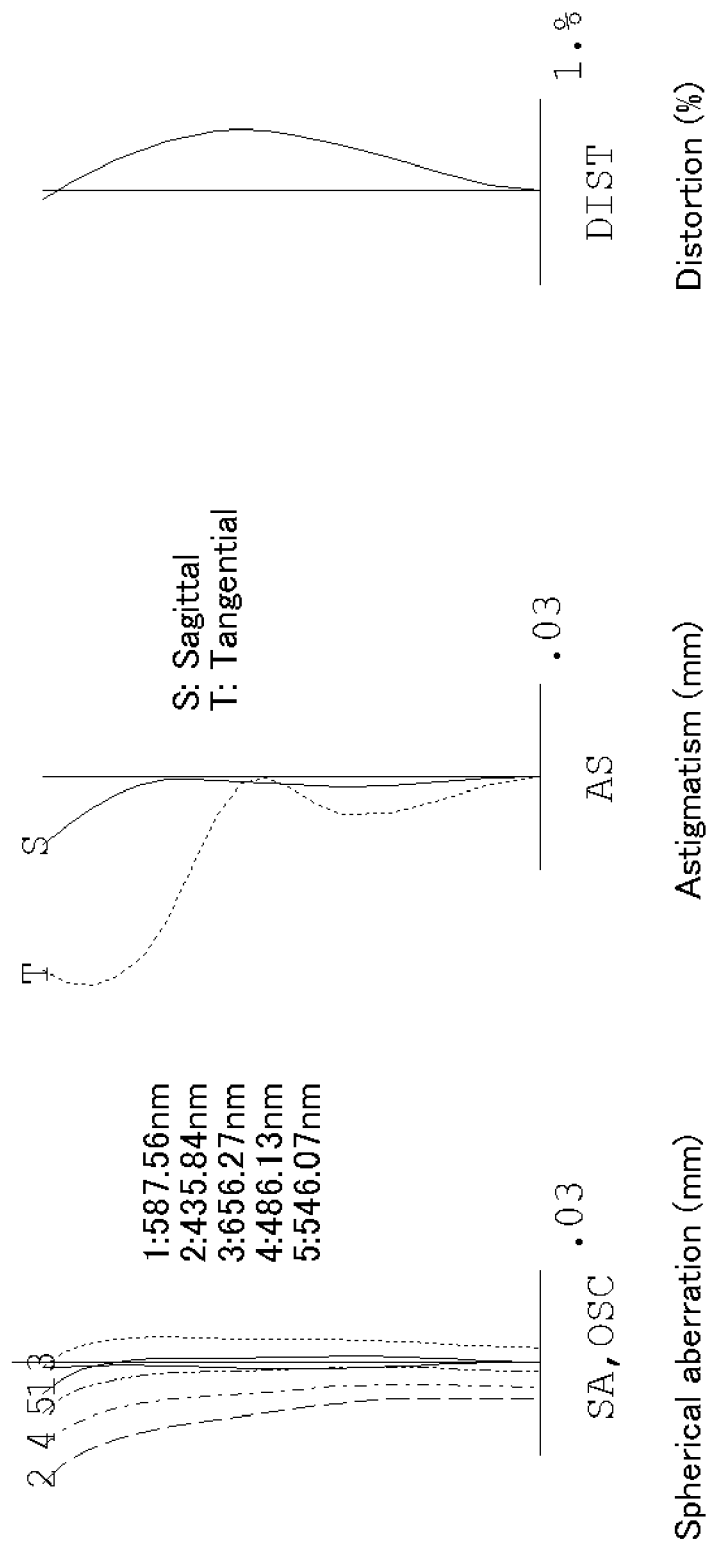
FIG. 12 is an aberration diagram showing a spherical aberration, an astigmatism, and a distortion of the imaging lens in Numerical Data Example 4.
Figure 13:
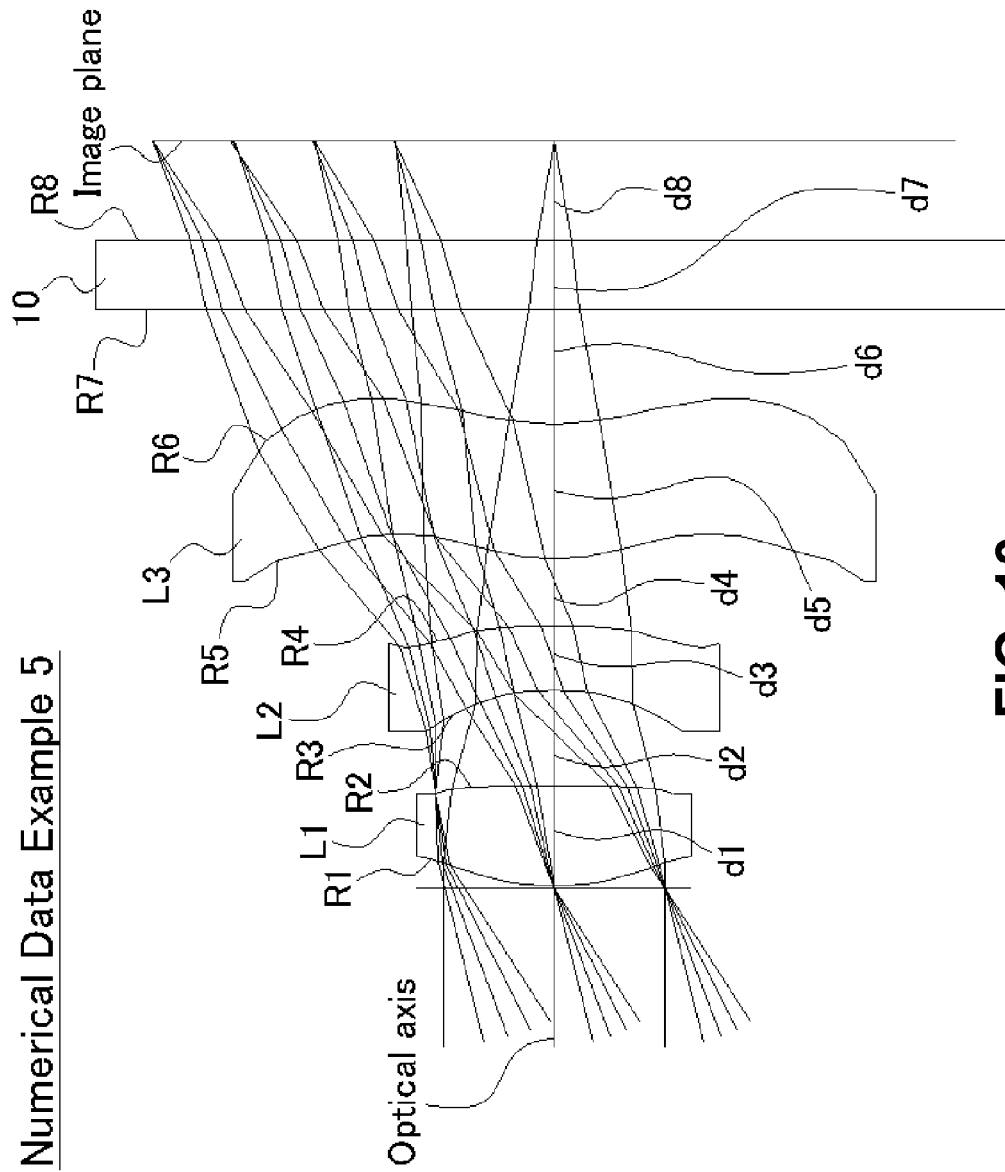
FIG. 13 is a schematic sectional view showing a configuration of an imaging lens in Numerical Data Example 5.

FIG. 11 shows the lateral aberration that corresponds to the half angle of view ω in the imaging lens of Numerical Data Example 4, and FIG. 12 shows the spherical aberration SA (mm), the astigmatism AS (mm), and the distortion DIST (%), respectively. As shown in FIGS. 11 and 12, in the imaging lens of Numerical Data Example 4, the respective aberrations are satisfactorily corrected similarly to Numerical Data Example 1. In addition, the distance from the surface of the first lens L1 on the object side to the image plane is 3.176 mm in air, and therefore the size of the imaging lens is suitably reduced.

Numerical Data Example 5

Basic lens data are shown below.

f=2.755 mm, Fno=2.856, ω=32.42°

| Surface Number i | R | d | Nd | vd |
|---|---|---|---|---|
| (object) | ∞ | ∞ | | |
| Aperture | ∞ | 0.0100 | | |
| 1* | 1.136 | 0.4350 | 1.52470 | 56.2 |
| 2* | 21.881 | 0.4174 | | |
| 3* | −1.364 | 0.2800 | 1.61420 | 26.0 |
| 4* | 42.459 | 0.2957 | | |
| 5* | 0.773 | 0.5920 | 1.52470 | 56.2 |
| 6* | 1.173 | 0.5000 | | |
| 7 | ∞ | 0.3000 | 1.51680 | 64.2 |
| 8 | ∞ | 0.4380 | | |
| (image plane) | ∞ | | | |

Unit: mm

Aspheric Surface Data

First Surface $k = -2.300818E-02, A_4 = -1.391323E-01, A_6 = 4.194751E-01, A_8 = -4.926605, A_{10} = 1.386314E+01, A_{12} = -2.049117E+01$ Second Surface $k = 0, A_4 = -5.392317E-01, A_6 = 2.460317, A_8 = -2.156797E+01, A_{10} = 8.275563E+01, A_{12} = -1.669028E+02, A_{14} = 1.298540E+02$ Third Surface $k = 0, A_4 = -1.867897, A_6 = 1.037025E+01, A_8 = -5.117494E+01, A_{10} = 1.744121E+02, A_{12} = -3.057382E+02, A_{14} = 2.117918E+02$ Fourth Surface $k = 0, A_4 = -2.632083 A_6 = 1.222260E+01, A_8 = -3.987763E+01, A_{10} = 8.906143E+01, A_{12} = -1.046172E+02, A_{14} = 5.002120E+01$ Fifth Surface $k = -5.156252, A_4 = -5.703766E-01, A_6 = 4.540397E-01, A_8 = -2.528004E-01, A_{10} = 1.021800E-01, A_{12} = -3.841394E-02, A_{14} = 3.092324E-02, A_{16} = -1.130705E-02$ Sixth Surface $k = -2.785630, A_4 = -4.282945E-01, A_6 = 2.568931E-01, A_8 = -6.094984E-02, A_{10} = -7.551341E-02, A_{12} = 6.798319E-02, A_{14} = -2.065826E-02, A_{16} = 1.609322E-03$ The focal lengths f1 to f3 of the respective lenses L1 to L3 are as follows:

f1=2.267 f2=−2.146 f3=2.862

The values of the respective conditional expressions are as follows:

f1/f2=−1.056

R3/R4=−0.032 f3/f=1.039

R5/f=0.281

R5/R6=0.659

Accordingly, the imaging lens of Numerical Data Example 5 satisfies the conditional expressions (1) to (6).

Figure 14:
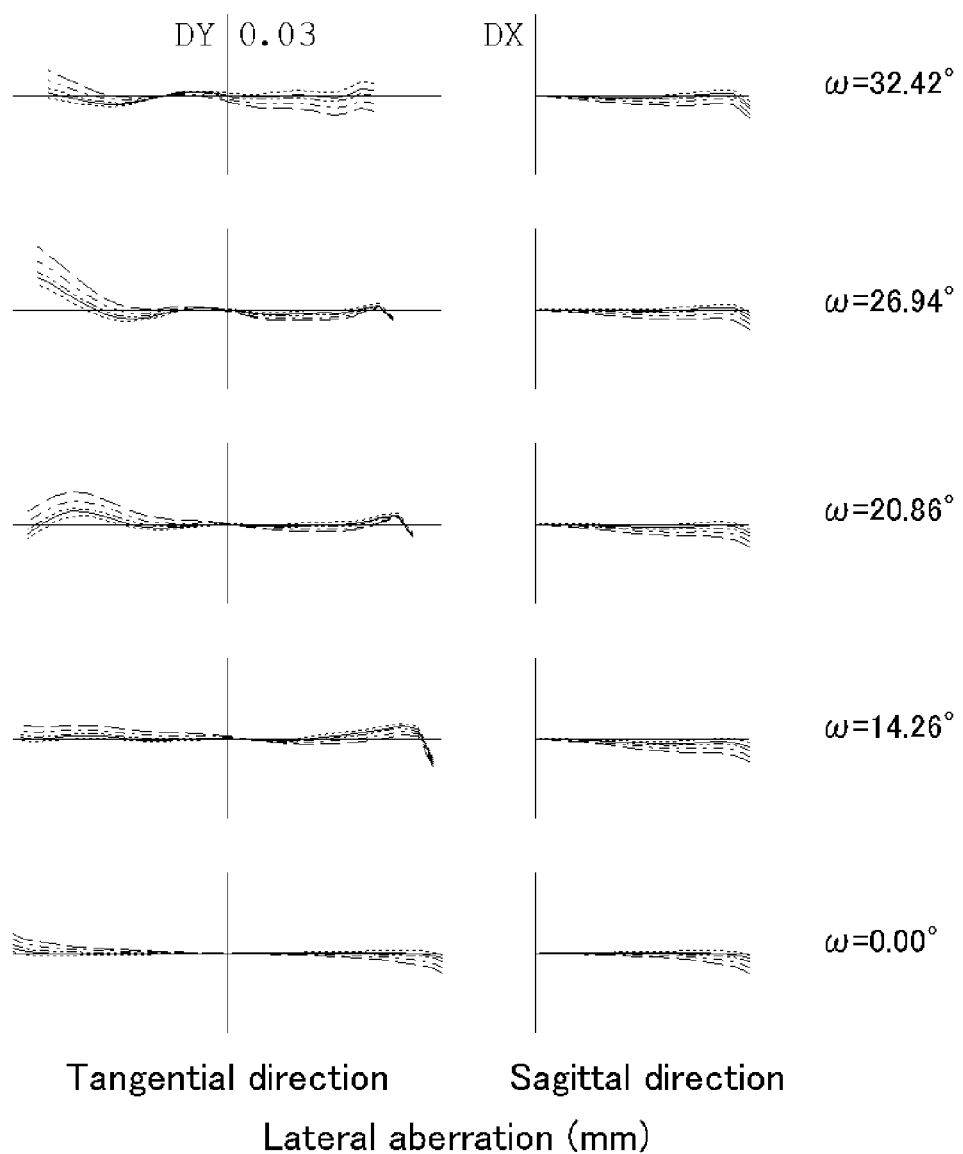
FIG. 14 is an aberration diagram showing a lateral aberration of the imaging lens in Numerical Data Example 5.
Figure 15:
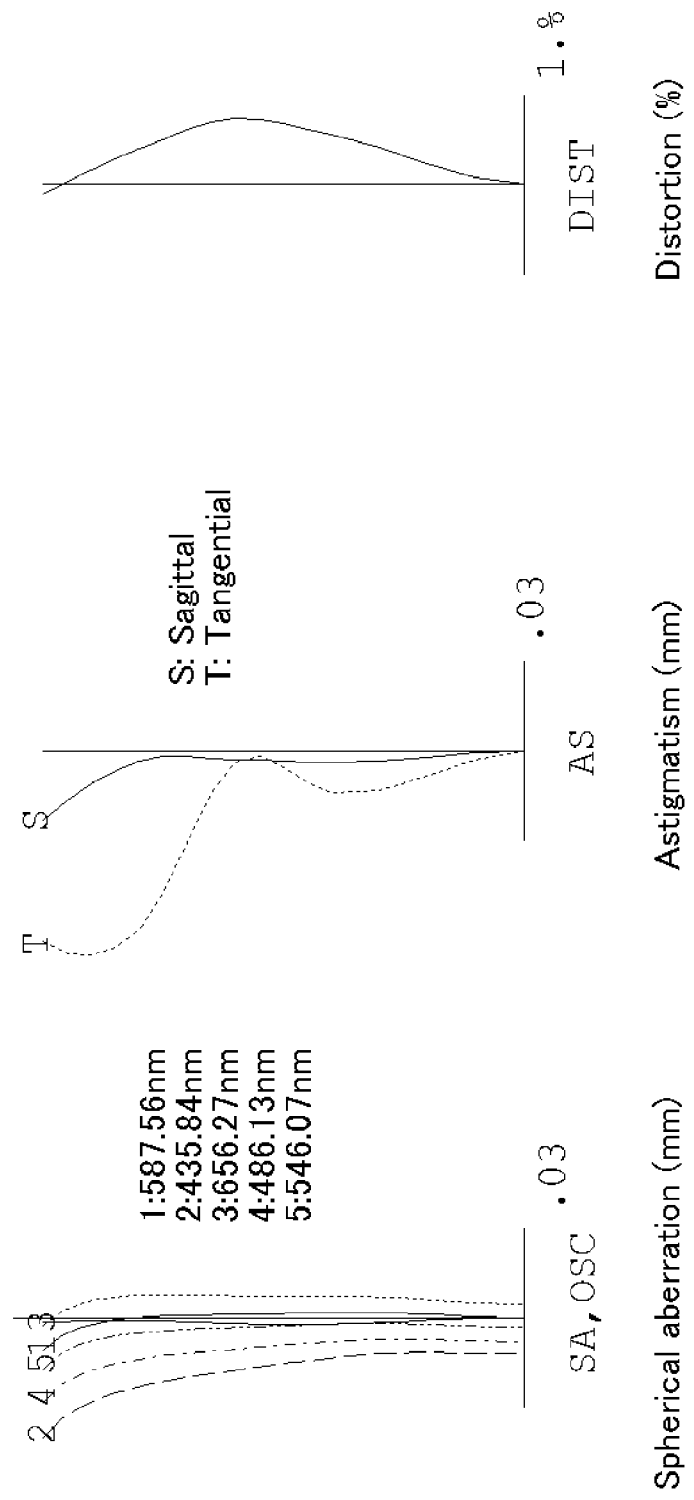
FIG. 15 is an aberration diagram showing a spherical aberration, an astigmatism, and a distortion of the imaging lens in Numerical Data Example 5.

FIG. 14 shows the lateral aberration that corresponds to the half angle of view ω in the imaging lens of Numerical Data Example 5, and FIG. 15 shows the spherical aberration SA (mm), the astigmatism AS (mm), and the distortion DIST (%), respectively. As shown in FIGS. 14 and 15, in the imaging lens of Numerical Data Example 5, the respective aberrations are satisfactorily corrected similarly to Numerical Data Example 1. In addition, the distance from the surface of the first lens L1 on the object side to the image plane is 3.155 mm in air, and therefore the size of the imaging lens is suitably reduced.

Accordingly, when the imaging lens of the embodiment is applied to an imaging optical system of a cellular phone, a digital still camera, a portable information terminal, a security camera, an onboard camera, a network camera, and the like, it is possible to achieve the high performance and the small size for the camera or the like.

Here, it is noted that the imaging lens of the invention shall not be limited to the above-described embodiments. In the above embodiments, the surfaces of the first lens L1 through the third lens L3 have the aspheric surfaces, and it is not necessary that all have the aspheric surfaces. For example, one surface or both surfaces of the first lens L1 may be formed to be spherical.

The invention may be applicable to the imaging lens of a device that is required to have a small size and satisfactory aberration correction ability, e.g., the imaging lenses used in the cellular phones, the digital still cameras, and the like.

What is claimed is:

1. An imaging lens comprising:

a first lens having positive refractive power;

a second lens having negative refractive power; and a third lens having positive refractive power arranged in an order from an object side to an image side, wherein said first lens is formed in a shape so that both a curvature radius of a surface thereof on the object side and a curvature radius of a surface thereof on the image side are positive, said second lens is formed in a shape so that a curvature radius of a surface thereof on the object side is negative and a curvature radius of a surface thereof on the image side is positive, said third lens is formed in a shape so that both a curvature radius of a surface thereof on the object side and a curvature radius of a surface thereof on the image side are positive, and said first lens has a focal length f1, said second lens has a focal length f2, said third lens has a focal length f3, and a whole lens system has a focal length f so that the following conditional expressions are satisfied:

$$f1 > |f2|$$

$$-1.5 < f1/f2 \leq -1.056$$

$$0.7 < f3/f \leq 1.039.$$

2. The imaging lens according to claim 1, wherein said second lens has the surface on the object side having a curvature radius R3 and the surface on the image side having a curvature radius R4 so that the following conditional expression is satisfied:

$-0.15 < R3/R4 < 0.$

3. The imaging lens according to claim 1, wherein a whole lens system has a focal length f and said third lens has the surface on the object side having a curvature radius R5 so that the following conditional expression is satisfied:

$R5/f < 0.35.$

* * * * *